United States Patent Office 3,310,596
Patented Mar. 21, 1967

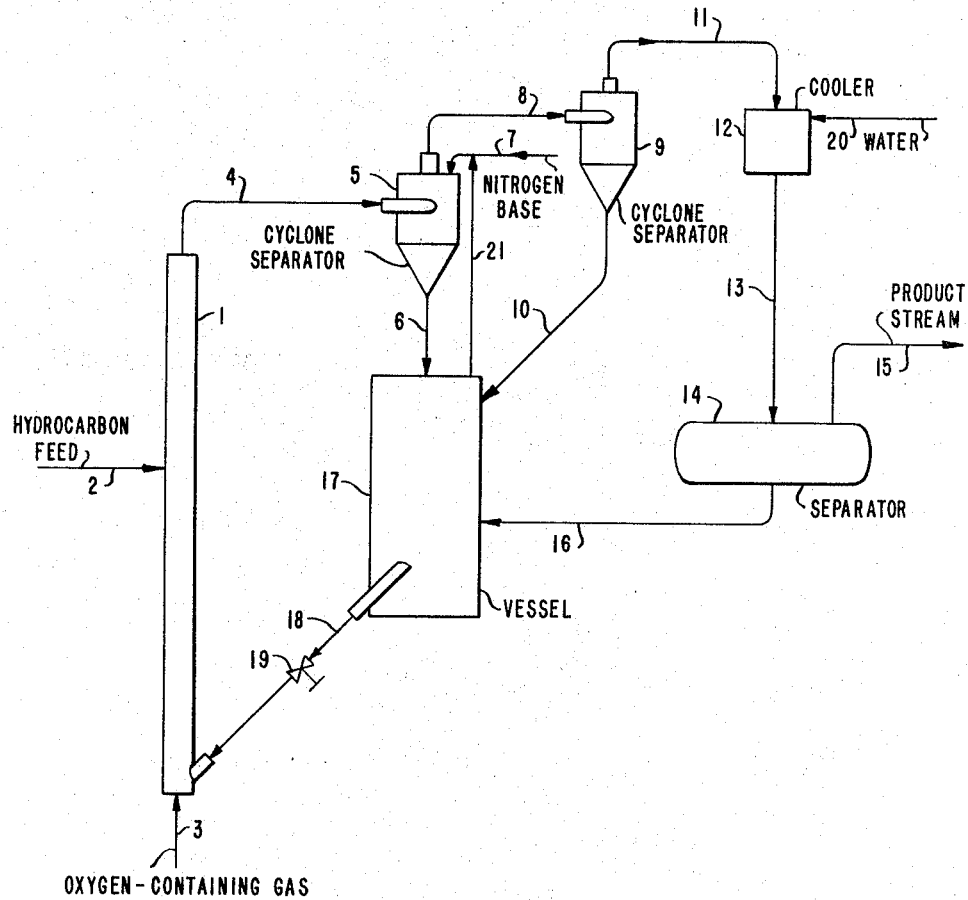

3,310,596
USE OF AMMONIA FOR IODINE RECOVERY IN
IODINATIVE DEHYDROGENATION PROCESS
Ralph W. King, London, England, assignor to Shell Oil
Company, New York, N.Y., a corporation of Delaware
Filed Feb. 24, 1964, Ser. No. 346,676
Claims priority, application Netherlands, Feb. 25, 1963,
289,388
5 Claims. (Cl. 260—680)

This invention relates to an improved process for the dehydrogenation of organic compounds. More particularly, it relates to the recovery of iodine slip from the reactor effluent in a process involving the dehydrogenation of hydrocarbons by reaction with iodine while in intimate contact with a finely divided fluidized hydrogen iodide acceptor.

Among recent developments which have been made in the general process of dehydrogenating organic compounds, there is one in which a mixture of the compound and a substantial proportion of elemental iodine in vapor phase is exposed to a temperature above 300° C. for a relatively short time. British Patent 793,214 describes this class of reaction. These dehydrogenation reactions include, for example, the conversion of paraffins to olefins and diolefins, of olefins to diolefins, of certain paraffins to aromatics (dehydrocyclization) and other reactions in which organic compounds are converted to other compounds having a higher carbon-to-hydrogen ratio, with the simultaneous conversion of iodine to hydrogen iodide. These reactions proceed generally with high efficiency at the preferred reaction conditions. It is possible to reduce materially the amount of elemental iodine that must be charged for the organic reactant by reconverting some of the hydrogen iodide to elemental iodine while it is present in the reaction mixture at reaction conditions. The iodine utilization is improved in such a process by adding oxygen together with iodine to the dehydrogenation reaction zone to convert formed hydrogen iodide to iodine and water—see, e.g., U.S. 2,890,253. This process has been further improved by effecting the iodine dehydrogenation in the presence of hydrogen iodide acceptors, e.g., metal compounds which yield iodides from which iodine can be recovered by treating with oxygen or oxygen-containing gases in a separate operation.

It has recently been proposed (U.S. application, Serial No. 277,732, filed May 31, 1963, now abandoned) that by employing a dispersed phase of finely divided hydrogen iodide acceptor in a vapor stream, continuous regeneration of the iodine necessary for dehydrogenation can be obtained, and the efficiency of the process greatly enhanced. In that process, the product stream gases contain entrained iodine and hydrogen iodide which are recovered by passing the gaseous stream through an additional hydrogen iodide acceptor material in the form of a fixed, moving or fluidized bed. An alternate method which has been previously utilized includes scrubbing the gaseous reactor product with dilute sodium bicarbonate to remove hydrogen iodide and forming sodium iodide from the free iodine which in turn can be recovered separately. However, it has been found that these methods of catching the iodine slip are not as efficient as desirable.

It is, therefore, a principal object of this invention to improve the recovery of iodine slip from an iodinative dehydrogenation process wherein the dehydrogenation is carried out in the presence of a fluidized particulate solid hydrogen iodide acceptor.

Other objects will appear from the description of the invention which will be made with reference to the accompanying drawing wherein:

The figure is a simplified flow diagram illustrating a preferred mode of practicing the invention.

Now, in accordance with the present invention, it has been found that the efficiency of recovery of iodine from the product gaseous stream in an iodative dehydrogenation process can be greatly enhanced and the system substantially simplified by injecting at least one or more nitrogeneous bases, e.g., ammonia, which are at least partly in the gaseous state, into the iodinative dehydrogenation reactor product stream containing the iodine and hydrogen iodide entrained therein. When one or more nitrogeneous bases are injected into the iodinative dehydrogenation reactor product stream containing both iodine and hydrogen iodide, wherein the temperature is maintained in excess of 350° C., free iodine is converted to hydrogen iodide. By subsequently cooling the stream, e.g., via a water quench to about 100° C., both the hydrogen iodide formed and that previously present react with the excess nitrogenous base forming an aqueous solution of the iodide of the nitrogenous base, which is retained by the quench solution, thereby separating the iodine slip from the product steram. The quench solution containing the iodide of the nitrogenous base is returned to the dehydrogenation-regeneration reaction zone via the return flow chamber through which the heated fluidized solid iodide acceptor (metal iodide and excess metal oxide) is being transported to the bottom of the regeneration zone. The fluidized solid iodide/oxide is at a temperature approximately that which is prevalent in the reaction zone and the iodide of the nitrogenous base decomposes releasing hydrogen iodide which in turn is carried along with the fluidized solid iodide/oxide and returned to the regeneration zone where it contacts additional oxygen.

Referring to the figure, the embodiment represented therein is a system in which the gas and solids are made to move in co-current flow in the reactor and both the dehydrogenation and the regeneration reactions are made to take place in upward flow. In the drawing, numeral 1 represents a regeneration-dehydrogenation chamber (hereinafter referred to as riser 1) having a hydrocarbon inlet line 2 at about the midpoint thereof and a gas inlet line 3 at its lower end. Through the inlet line 2 the hydrocarbon to be dehydrogenated is introduced whereby the dehydrogenation occurs in the section of riser 1 above inlet line 2. Oxygen-containing, fluidizing gas, containing inert gas components such as nitrogen and/or steam, is supplied through line 3 and the oxygen reacts with the iodide forming an oxide and free iodine in that portion of riser 1 located between inlet line 3 and inlet line 2. The fluidized mixture of reaction product gas and inert gas and iodide acceptor pass through line 4 to a primary cyclone separator 5 wherein the entrained solid particles are seperated from the gaseous stream. These solid particles are removed through discharge line 6. The gaseous nitrogenous base is introduced into cyclone 5 through inlet line 7 adjacent to the gas outlet. This nitrogenous base vapor is mixed with the reaction product gaseous stream exiting through outlet line 8 to a secondary cyclone separator 9 wherein any additional solid particles not removed in the primary cyclone separator are separated and removed via discharge line 10. The gaseous product, at a temperature in excess of 350° C., and rich in hydrogen iodide is passed via outlet line 11 into cooler 12 wherein the gaseous product stream is quenched by mixing with an aqueous stream from line 20 to a temperature of about 100° C. thereby converting substantially all of the hydrogen iodide present in the reaction product stream to an iodide of the nitrogenous base. This iodide passes along with the gaseous product stream through outlet line 13 into separator 14 wherein the gaseous product stream is stripped of the iodide and is separated via line 15. The aqueous solution of the iodide of the nitrogenous base passes out of separator 14 through line 16 into vessel 17 containing the separated hot solid iodide/oxide from primary and secondary cyclone separators 5 and 9. In vessel 17 the nitrogenous base iodide is decomposed to hydrogen iodide and the nitrogenous base. The hydrogen iodide is entrained with the solid iodide/oxide and returned to riser 1 via downer line 18 through an adjustable valve 19, while the nitrogenous base passes through line 21 to line 7 and primary cyclone 5 to react with more iodine passing out with the gaseous product stream.

Details as to relative sizes, shapes and placement of the pieces of equipment and provision of gas compressors, valves, baffles, fluid seals and the like are omitted for clarity since they will be readily supplied by those skilled in the relevant art.

The temperatures at which hydrocarbons are dehydrogenated and iodine is regenerated are usually in the range of from 300° C.–700° C., preferably 400° C.–600° C. In certain cases temperatures lower than 300° C. may, however, also lead to favorable results, particularly in the regeneration reaction, e.g., 150° C.–300° C. The pressure employed may be atmospheric, although higher or lower pressures may also be used.

The organic material being dehydrogenated in the fluidized system utilized in the practice of this invention may be a hydrocarbon or may contain a hydrocarbyl group together wtih one or more other atom species such as oxygen or nitrogen, as in esters, ketones, nitriles, etc. Thus, saturated aliphatic compounds include acyclic and alicyclic hydrocarbons which may be dehydrogenated to the corresponding unsaturates, which may be monoolefinic, diolefinic, polyolefinic and acetylenic, depending upon the relative proportions of the reactants, the particular conditions of temperature, pressure and contact time empolyed and the particular hydrocarbon used. It is unnecessary to start with fully saturated materials since partially unsaturated hydrocarbons may be further converted to form di- or polyunsaturates. For example, butene-1 and butene-2 yield butadiene-1,3; isobutene yields isobutylene; n-butane yields a mixture of butene and butadiene; isopentane yields a mixture of isopentenes and isoprene; propane yields propylene; ethane yields ethylene; cyclopentane yields cyclopentene and cyclopentadiene; methylcyclopentene yields methylcyclopentadiene; cyclohexane yields largely cyclohexatriene-1,3,5(benzene); n-hexane yields hexene, hexadione and benzenes; n-heptane and isoheptane yield toluene: 2,5-dimethylhexane yields para-xylene; 2,4-dimethylhexane yields m-xylene.

The dehydrogenatable hydrocarbons may contain aromatic portions attached to a dehydrogenatable aliphatic group, such as arylalkane, including aryl cycloalkanes.

Various nitrogenous bases may be used in the practice of this invention. For instance, primary aliphatic, cycloaliphatic or aromatic amines are quite suitable for recovering the iodine slip. Also suitable are secondary or tertiary amines, including cyclic amines such as pyridine, quinoline and the corresponding, more saturated compounds, polyamines such as ethylene diamine, and inorganic nitrogenous bases such as hydrazine and/or ammonia. A nitrogenous base which is gaseous under normal conditions (25° C., 1 atm.), for example methyl-, dimethyl-, trimethyl- or ethylamine or a solution thereof, is preferably used, with particular preference being given to ammonia, as the nitrogenous base. In those cases where an aqueous solution of a nitrogenous base is used, it is sometimes advisable to employ a mixture of such a solution and an organic solvent, e.g., a hydrocarbon such as benzene, in order to obviate the possible formation of a small quantity of tarry products.

The nitrogenous base is preferably introduced into the product reactor stream at a temperature range of 200° C. to 700° C. with a temperature of 300° C. to 400° C. being particularly preferred. Furthermore, it is advisable in the proposed process to cool at least some of the mixture formed upon contacting, to a temperature of below 150° C. and preferably to a temperature of between 85 and 110° C. By so doing the hydrogen iodide present and that formed by the initial reaction reacts completely with the nitrogenous base, thereby converting the hydrogen iodide to the nitrogenous base iodide. The hydrogen iodide is thereby completely bound to the nitrogenous base as a result of this cooling. It is most preferred to produce the cooling by the addition of water to the gas mixture thereby forming an aqueous solution of the iodide. Although this aqueous solution may be passed directly to the regeneration zone, it is preferred that the iodide solution contact in a separate space at a temperature which is equal or slightly lower than the dehydrogenation temperature, the finely divided solid materials separated from the mixture carried out of the reactor. Under these conditions the iodide of the nitrogenous base immediately decomposes which results in the released hydrogen iodide being bound by the solids with the formation of the iodide of the solids. In this form the iodide is returned to the regeneration zone. At this point the liberated nitrogenous bases are removed and recycled to the primary cyclone separator. As a further modification, an inert gas such as nitrogen may be passed through the zone wherein the iodide of the nitrogenous base was contacted with the finely divided solids, thereby facilitating transport of the liberated nitrogenous base.

The following specific example of the invention will serve to illustrate more clearly the application of the invention, but is not to be construed as in any manner limiting the invention.

*Example*

The apparatus was constructed in accordance with the aforementioned system as described in the figure. Butane was dehydrogenated by means of iodine. The solid substance reacting as HI-acceptor with the hydrogen iodide was a mixture of CaO and $Mn_3O_4$ in the molar ratio of 6:1. As carrier therefor use was made of aluminium oxide ($\alpha$ alumina). The ratio by weight of the acceptor oxides to the carrier was 1:9. The oxygen-containing gas was air. The inert gas was nitrogen.

Per hour were added: 45 l. normal butane, 200 l. air and 200 l. nitrogen. The temperatures at the bottom and the top of the riser were 350° C. and 510° C., respectively. Ammonia was used as the nitrogenous base. The operating pressure was maintained at approximately 1.5 atmospheres absolute and the average temperatures in the line 7, the separator 14, and the vessel 17 were maintained at 350° C., 96° C., and 500° C., respectively. A butane conversion of 70–85% was obtained with a selectivity to butadiene of 80–90%. Substantially all the iodine was retained in the system.

I claim as my invention:

1. In a process for the conversion of a first hydrocarbon to at least a second hydrocarbon having a higher carbon-to-hydrogen ratio wherein (a) the first hydrocarbon and iodine are reacted in intimate contact with a finely divided fluidized metal compound hydrogen iodide acceptor in a dehydrogenation zone at a temperature in excess of 300° C. whereby the second hydrocarbon is formed and (b) iodine is continuously regenerated from formed metal iodide, the improvement comprising:

(a) injecting an excess of a gaseous nitrogenous base into the reactor product stream while maintaining the temperature in excess of 300° C., thereby converting entrained iodine to hydrogen iodide;

(b) quenching the gaseous stream with water to a temperature below 150° C. thereby converting the hydrogen iodide with nitrogenous base to the iodide of the nitrogenous base;

(c) separating the iodide of the nitrogenous base from the reactor product stream as an aqueous solution in water;

(d) contacting the iodide solution with hot finely divided metal iodide/oxide thereby liberating iodine for further dehydrogenation; and (e) recycling the iodine to the dehydrogenation zone.

2. A process in accordance with claim 1 wherein the regeneration is performed at 150–300° C. and the dehydrogenation is performed at 400–600° C.

3. A process in accordance with claim 1 wherein the quenching lowers the temperature of the gaseous stream to about 100° C.

4. A process in accordance with claim 1 wherein the first hydrocarbon is butane and the second hydrocarbon is butadiene.

5. A process in accordance with claim 1 wherein the nitrogenous base is ammonia.

References Cited by the Examiner

UNITED STATES PATENTS

| | | | |
|---|---|---|---|
| 3,080,435 | 3/1963 | Nager | 260—680 X |
| 3,106,590 | 10/1963 | Bittner | 260—680 X |
| 3,207,805 | 9/1965 | Gay | 260—680 |

DELBERT E. GANTZ, *Primary Examiner.*

G. E. SCHMITKONS, *Assistant Examiner.*